No. 876,834. PATENTED JAN. 14, 1908.
R. L. PETTIT.
COMBINED POTATO DIGGER AND SEPARATOR.
APPLICATION FILED DEC. 22, 1906.
2 SHEETS—SHEET 1.
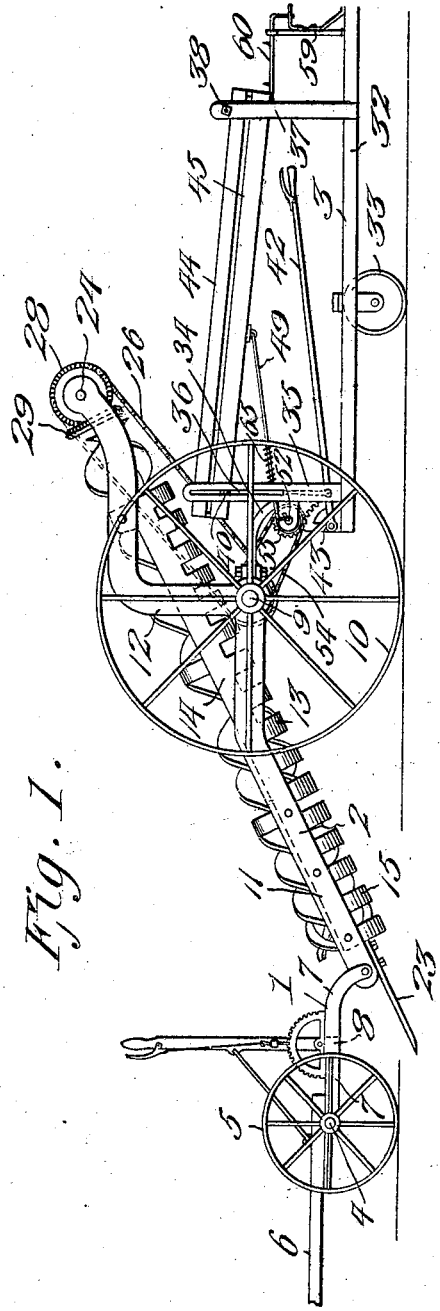
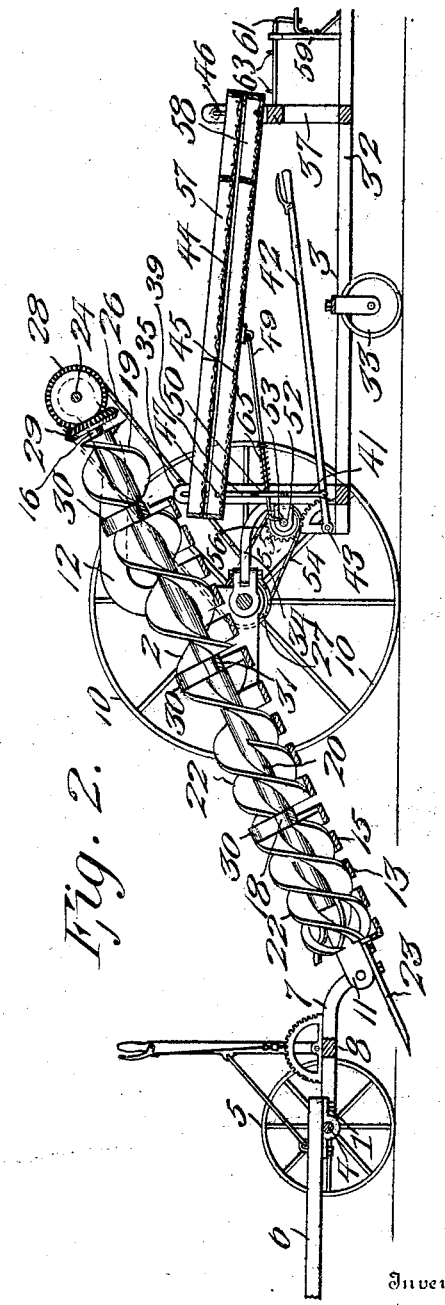
Witnesses
Frank B. Hoffman
D. W. Gould.
Inventor
Robert L. Pettit
By Victor J. Evans
Attorney No. 876,834.
R. L. PETTIT.
COMBINED POTATO DIGGER AND SEPARATOR.
APPLICATION FILED DEC. 22, 1906.
PATENTED JAN. 14, 1908.
2 SHEETS—SHEET 2.
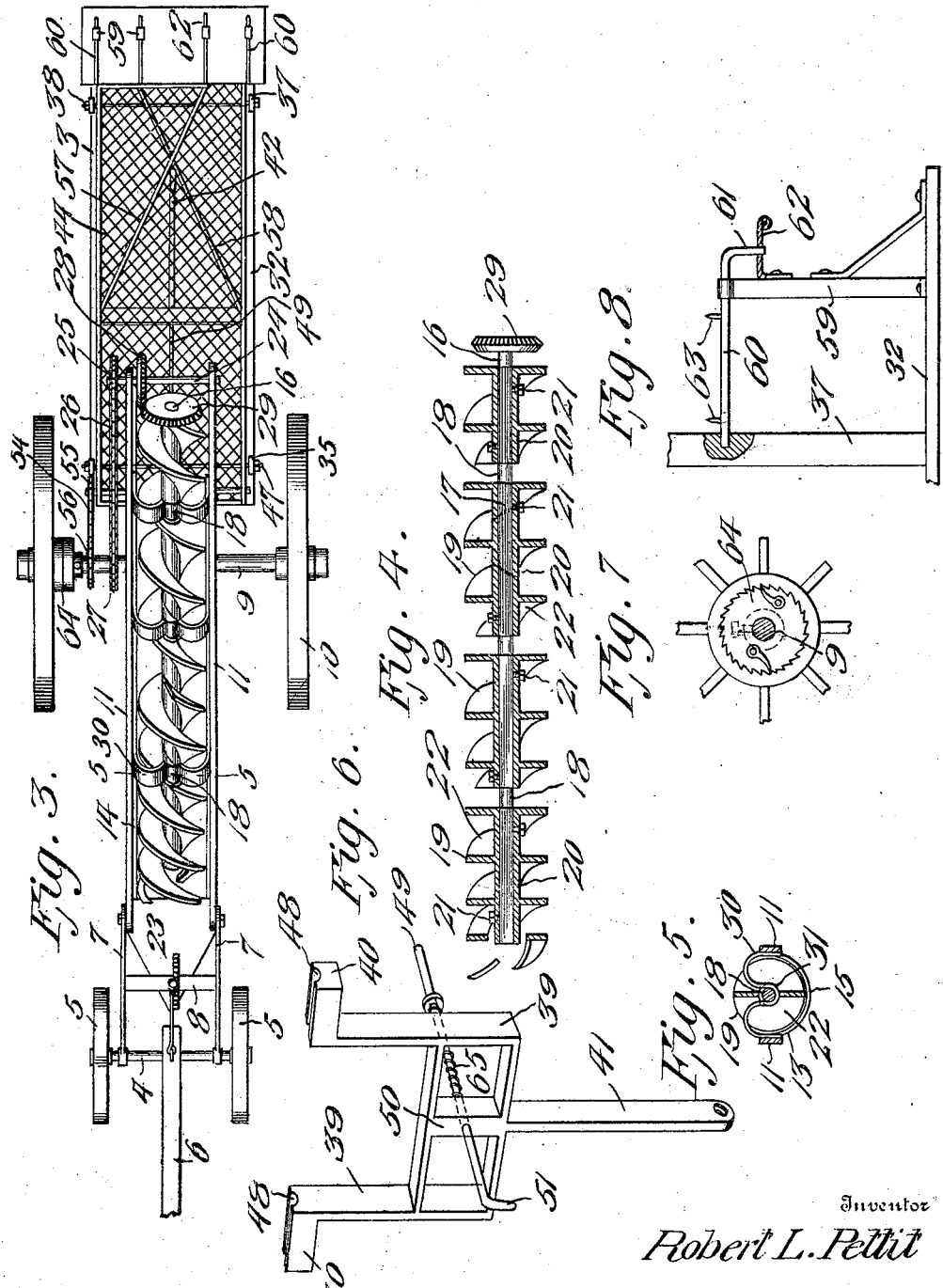
Witnesses
Frank B. Hoffman
D. W. Gould.
Inventor
Robert L. Pettit
By Victor J. Evans
Attorney

UNITED STATES PATENT OFFICE.

ROBERT L. PETTIT, OF GREAT FALLS, MONTANA.

COMBINED POTATO DIGGER AND SEPARATOR.

No. 876,834.　　　　　Specification of Letters Patent.　　　　　Patented Jan. 14, 1908.

Application filed December 22, 1906. Serial No. 349,136.

*To all whom it may concern:*

Be it known that I, ROBERT L. PETTIT, a citizen of the United States, residing at Great Falls, in the county of Cascade and State of Montana, have invented new and useful Improvements in Combined Potato Diggers and Separators, of which the following is a specification.

The invention relates to an improvement in combined potato diggers and separators designed primarily for continuous travel lengthwise of the field and serving in operation to dig the potatoes from the ground, effectively separate the dirt therefrom and sort the potatoes and deliver them into receptacles carried by the machine.

The main object of the present invention is the production of a potato digger and separator in which the conveying means for elevating the potatoes from the shovel to the separating screens is arranged in sections and constructed to provide a gradually increasing rate of travel of the material from the shovel to the screens, whereby to avoid choking at the shovel end of the conveyer.

The invention will be described in the following specification, reference being had particularly to the accompanying drawings, in which:—

Figure 1 is a side elevation of a machine constructed in accordance with my invention, Fig. 2 is a longitudinal central section of the same, the conveyer being shown in elevation, Fig. 3 is a top plan of the same, Fig. 4 is a longitudinal central section of the conveyer, Fig. 5 is a transverse section on line 5—5 of Fig. 3, Fig. 6 is a detail perspective showing the vibratory and adjusting means for the screens, Fig. 7 is a face view of one of the clutch members of the ground wheels, Fig. 8 is a view in elevation partly in section showing the means for supporting the potato bags or receptacles.

Referring particularly to the drawings, wherein similar reference numerals indicate like parts throughout the several views, my improved potato digger and separator comprises three essential parts, a draft frame 1, a digging and conveying frame 2, and a separating frame 3. The draft frame is designed simply to provide the supporting means for the forward end of the conveyer frame and comprises the forward axle 4 on which are mounted the forward ground wheels 5. The draft tongue 6 is connected to the axle, as are also rearwardly extending frame bars 7 connected intermediate their ends by a transverse brace bar 8, all as more clearly shown in Fig. 3.

The conveyer frame is supported upon the rear axle 9, on which are mounted the rear ground wheels 10. The frame proper comprises side bars 11, which are formed intermediate their ends with a right angle portion 12, journaled at the juncture of the arms thereof on the axle. From the forward end of the horizontal arm of the portion 12 of the frame bar, said frame bar extends forwardly and downwardly at an incline, while from the upper end of the vertical portion of the part 12 of the frame bar, said bar extends rearwardly in a slightly curved relation, terminating beyond the ground wheels 10, as clearly shown in Fig. 1. The side bars 11 are maintained in spaced relation through the medium of a sifting frame 13 comprising side plates 14 connected by semi-cylindrical spaced plates 15, the latter depending below the side bars of the conveyer frame when the sifting bars are in place, and serving to permit the escape of dirt and other refuse, in the operation of the conveyer. The sifting frame is secured between the side bars of the conveyer frame through the medium of rivets or the like, and is of a length to extend from a point in rear of the forward end of the conveyer frame to near the rear end thereof.

The conveyer proper comprises a shaft 16 shaped to provide a series of square lengths 17 separated by intermediate bearing portions 18. The conveyer screw includes a series of sections 19, of a length to correspond to the respective squared sections 17 of the shaft. Each section of the screw includes a sleeve 20 interiorly squared to fit the squared contour of the shaft and provide a set screw 21 adjacent the respective ends to secure the same in applied position to the shaft. Surrounding the sleeve is a spiral blade or blades 22. The convolutions of the blades of the respective sections differ as to the spaces between them, this being also true, though in less degree, of the spaces between the respective convolutions of each section. That is to say the spaces between the convolutions of the respective sections gradually increase toward the discharge end of that section, and the spaces between the convolutions of the lowermost sections are materially less than the convolutions of the next succeeding section and so on throughout the length of the conveyer. By this construction the travel of the material admitted at the lower end of the lowermost section is quite slow as compared with the travel of the material at the discharge end of the uppermost section, whereby I am enabled in the operation of the machine to avoid choking of the conveyer, it being understood that at the inlet end of the lowermost section practically all of the dirt elevated with the potatoes is delivered to the conveyer and as the material travels longitudinally of the conveyer the refuse is continually discharged. Hence, at the point of inlet, the travel thereof is comparatively slow, being gradually increased as the quantity of material is reduced.

At the forward end the side bars 11 of the elevator frame are provided with a shovel 23 preferably of triangular shape, as shown, and adapted when the parts are in operative position to enter the ground and be drawn along beneath the normal depth of the potatoes, serving to elevate the potatoes and accumulated dirt upon the shovel and into the operative plane of the conveyer screw. The rear end of the side bars 11 of the conveyer frame supports a transversely arranged shaft 24 one end of which projects beyond one of the side bars and is provided with a sprocket wheel 25 in operative connection through the medium of a sprocket chain 26 with a sprocket wheel 27 mounted upon the rear axle 9. Between the side plates 11 the shaft 24 is provided with a bevel gear 28 designed to mesh with and operate a bevel gear 29 secured upon the end of the conveyer shaft 16. The conveyer is supported within the conveyer frame by hanger straps 30, preferably terminally secured to the side bars 11 and projected therefrom in upward rounded contour and centrally depressed to form a rounded socket 31 arranged centrally of the conveyer frame and adapted to receive the rounded portions 18 of the conveyer shaft. The hanger straps 30 are positioned longitudinally of the conveyer frame, so as to coöperate with the portions 18 of the shaft, thereby supporting the shaft within the conveyer frame in a manner to permit its free independent rotation and yet prevent its independent longitudinal movement.

In rear of the conveyer frame is arranged the separating frame 3 which comprises a skeleton platform 32 supported intermediate its ends upon ground wheels 33 and connected at its forward end by straps 34 to the rear axle 9, said straps having preferably a pivotal connection with a sleeve loosely mounted on the axle, as shown. At the forward end of the platform 3 are mounted spaced standards 35, each formed with a longitudinally arranged slot 36, and at the rear end of the platform are mounted similar standards 37 formed at their upper ends with openings 38. A U-shaped supporting frame 39 is slidably mounted between the forward standards 35, the upper ends of the side bars of said frame having laterally projecting arms 40 which are slidably mounted in the slots 36 in the respective standards. The lower end of the U-frame is formed with a depending lug 41 pivotally connected to the adjusting lever 42, the forward end of which is pivotally mounted upon a notched segment 43 secured upon the platform, the lever having the usual dog to coöperate with this segment.

A screen box is mounted between the upper ends of the standards, being provided with two screens 44 and 45, the former being of larger mesh than the latter. At the rear end the box is supported on crank hangers 46 movably fitted in openings 38 in the rear standards, the forward end of the box being supported upon crank hangers 47 which bear at their upper ends in recesses 48 formed in the blocks 40 in the supporting frame.

An agitating means is provided for the screen through the medium of a rod 49 loosely connected to the under side of the screen box and projecting at its forward end through a stay bar 50 carried by the supporting frame. The forward end of the rod is bent laterally to provide a finger 51, and a shaft 52 mounted in hangers supported by the forward standards is provided with an offset or lip 53 adapted to engage the finger 51 of the rod and draw the rod forward a predetermined distance, as will be obvious. The shaft 52 is driven through the medium of a sprocket chain 54 engaging a sprocket wheel 55 on the shaft 52 and a sprocket wheel 56 on the rear axle 9. The upper screen 44 which is designed to receive and retain the larger potatoes is provided with an inclined deflector plate 57 leading from one side edge of the screen to the rear end, being spaced at the rear end a short distance from the opposite side, thereby directing all the potatoes traveling over the screen 44 to a narrow or restricted passage adjacent one side edge of the screen. The lower or finer screen 45 designed to retain the smaller potatoes is similarly provided with a deflector plate 58 projected; however, in a direction reverse to the plate 57 and disposing the outlet from the lower screen at the edge of the screen box opposite the outlet from the larger screen. In rear of the standards 37 the platform 32 is extended in the form of a solid platform and is provided with a series of uprights 59, in the upper end of each of which is mounted a holding bar 60, the forward end of the bar being mounted in a cross bar 61 uniting the rear standards 37. The bars 60 project rearwardly beyond the uprights 59 and are bent downwardly at 61, and said uprights are formed with spring catches 62 to engage the depending portions of the bars 60 when the latter are in operative position. The relatively upper surface of each bar 60 is provided with spaced spur points 63, and the uprights are so disposed on the platform extension, as to aline a pair of the bars 60 with the side edges of the respective outlets from the screens, as clearly shown in Fig. 3.

To insure operative movement of the parts in the forward travel of the machine and prevent their movement in the rearward travel thereof I connect the rear ground wheels 10 with the rear axle 9 through the intermediate provision of clutches 64, which may be of any usual or preferred type adapted to secure the wheels and axle together in the forward movement of the parts and to permit independent movement of the wheel in the rearward travel. The jogging rod 49 is moved in one direction through the coöperation of the lip 51 and offset 53, and in the opposite direction by a spring 65 encircling the rod and bearing between a fixed collar thereon and the bar 50 of the U-shaped supporting frame 39, as clearly shown in Fig. 6.

With the parts constructed and arranged as described the machine is drawn longitudinally of the row of potatoes, bags having been previously secured between the respective bars 60 of each pair by passing the material of the bag over the spur points 63. The potatoes are dug from the ground through the medium of the shovel 23, and ride up the latter into the operative plane of the conveyer screw. Through the operation of the screw the mass is moved rearwardly and upwardly, the dirt and other refuse gradually separating from the potatoes and being discharged between the plates 15 of the sifting frame. The potatoes are discharged at the rear end onto the upper screen 44, the larger potatoes being retained on said screen and the smaller potatoes passing through the openings in the screen onto the smaller screen. Through the medium of the jogging rod described and the crank arms a vibratory movement is imparted to the screen by which the potatoes are cleared of all adherent dirt and the potatoes finally discharged into the bags supported by the bars 60. When the bags are sufficiently filled the catches 62 are released and the weight of the bags serves to revolve the bars 60 and draw the material of the bags from the spurs 63. The potatoes are thus effectively separated from the dirt and other material and are sorted and delivered into receptacles at the rear of the sorting frame.

Having thus described the invention what 5 is claimed as new, is:—

1. A potato digger including a shovel and a separator having a conveyer arranged intermediate the shovel and separator, said conveyer being arranged to gradually increase the rate of travel of the material from the shovel toward the separator.

2. The combination of a potato digger having a shovel and a separator, of a conveyer arranged between the shovel and separator and comprising a series of independent screw sections arranged in alinement for simultaneous and uniform movement.

3. The combination of a potato digger having a shovel and a separator, of a conveyer arranged between the shovel and separator and comprising a series of independent screw sections arranged in alinement for simultaneous and uniform movement, the convolutions of the respective sections being differently spaced.

4. The combination of a potato digger having a shovel and a separator, of a conveyer arranged between the shovel and separator and comprising a series of independent screw sections arranged in alinement for simultaneous and uniform movement, the convolutions of the section adjacent the shovel being increasingly spaced from the shovel end toward the opposite end.

5. The combination of a potato digger having a shovel and a separator, of a conveyer arranged between the shovel and separator and comprising a series of independent screw sections arranged in alinement for simultaneous and uniform movement, the convolutions of each section being increasingly spaced from each other toward the discharge end of the section, and the convolutions of each section being a greater distance apart than the convolutions of the preceding section.

6. In a potato digger the combination with a shovel and a separator, of a conveyer arranged between the shovel and separator and comprising a shaft formed with a series of squared portions, and a conveyer screw arranged in sections and secured respectively to the squared portions of the shaft.

7. In a potato digger the combination with a shovel and a separator, of a conveyer arranged between the shovel and separator and comprising a shaft formed with a series of squared portions, a conveyer screw arranged in sections and secured respectively to the squared portions of the shaft, and means for revolubly supporting the shaft, said means engaging the shaft intermediate the squared portions thereof.

8. In a potato digger the combination with a shovel and a separator, of a conveyer arranged to deliver material from the shovel to the separator, said conveyer comprising a screw and means for operating the same, a conveyer frame for supporting the screw, and a sifting frame comprising side bars to be secured to the conveyer frame and depending semi-cylindrical plates arranged transversely of the conveyer frame in spaced relation throughout the sifting frame.

In testimony whereof, I affix my signature in presence of two witnesses.

ROBERT L. PETTIT.

Witness:
C. A. BENSON,
C. O. THORSTAD.